United States Patent [19]
Shanklin et al.

[11] Patent Number: 5,816,447
[45] Date of Patent: Oct. 6, 1998

[54] NON-AEROSOL PUMP SPRAY APPARATUS

[75] Inventors: Donald J. Shanklin, Fullerton; Ronald F. Englhard, Mission Viejo, both of Calif.

[73] Assignee: Hayes Products, LLC, Santa Fe Springs, Calif.

[21] Appl. No.: 812,790

[22] Filed: Mar. 6, 1997

[51] Int. Cl.⁶ .................................................. B67D 5/42
[52] U.S. Cl. .................... 222/1; 222/153.13; 222/324; 222/340; 222/341; 222/384; 222/385
[58] Field of Search ..................... 222/1, 321.9, 323, 222/324, 153.13, 384, 385, 340, 341, 383.1, 383.3, 401; 239/333, 373

[56]  References Cited

U.S. PATENT DOCUMENTS

| | | |
|---|---|---|
| 1,417,951 | 5/1922 | Staples et al. . |
| 1,730,684 | 10/1929 | Phillips . |
| 1,814,504 | 7/1931 | Collins . |
| 2,048,142 | 7/1936 | Santurello . |
| 2,341,031 | 2/1944 | Flynn . |
| 2,342,288 | 2/1944 | Mai . |
| 2,521,164 | 9/1950 | Hayes . |
| 2,865,540 | 12/1958 | Gray ................................. 222/385 X |
| 2,881,810 | 4/1959 | Breitenstein . |
| 3,124,080 | 3/1964 | Sisson ............................... 222/385 X |
| 3,299,960 | 1/1967 | Stern . |
| 3,792,800 | 2/1974 | Capra et al. . |
| 3,797,748 | 3/1974 | Nozawa et al. . |
| 3,901,414 | 8/1975 | Capra et al. . |
| 3,901,449 | 8/1975 | Bochmann . |
| 3,921,861 | 11/1975 | Kondo . |
| 3,940,029 | 2/1976 | Horvath . |
| 4,105,145 | 8/1978 | Capra . |
| 4,109,832 | 8/1978 | Kutik et al. . |
| 4,155,489 | 5/1979 | Steiman . |
| 4,167,941 | 9/1979 | Capra et al. . |
| 4,174,055 | 11/1979 | Capra et al. . |
| 4,176,764 | 12/1979 | Capra et al. . |
| 4,183,449 | 1/1980 | Blake . |
| 4,192,464 | 3/1980 | Bochmann . |
| 4,210,261 | 7/1980 | Trujillo et al. . |
| 4,222,500 | 9/1980 | Capra et al. . |
| 4,222,501 | 9/1980 | Hammett et al. . |

(List continued on next page.)

FOREIGN PATENT DOCUMENTS

| | | |
|---|---|---|
| 0583902A1 | 2/1994 | European Pat. Off. . |
| 935738 | 8/1993 | South Africa . |
| 963912 | 7/1964 | United Kingdom . |
| 2269796 | 2/1994 | United Kingdom . |
| WO9403278 | 2/1994 | WIPO . |

*Primary Examiner*—Kevin P. Shaver
*Attorney, Agent, or Firm*—Knobbe, Martens, Olson & Bear, LLP

[57]  ABSTRACT

An assembly including a pump attachment particularly adapted to form an nonaerosol pump sprayer, and a method of using the same. The apparatus desirably includes an attachment having a pump sprayer which is pressurized on the upstroke enabling the sprayer to be shipped and stored in a relaxed position. The attachment includes a body, a coupling, a shaft, a piston, an inlet valve and a biasing member. The body defines an elongate chamber having the first end, second end, and an interior wall extending between the first end and second end. The coupler is sized and shaped to secure the body to the neck of a container. The shaft extends through the opening in the first end of the chamber and defines an internal flow channel. The piston is reciprocally mounted within the chamber and includes an inner annular surface surrounding the shaft and an outer annular surface sized and shaped to form a sealing engagement with the interior wall of the body. The attachment defines a sealing surface substantially fixed with respect to the piston and a second sealing surface substantially fixed with respect to the shaft. The first sealing surface and the second sealing surface having the first position wherein the first sealing surface and the second sealing surface cooperate to prevent the flow of liquid between the piston and the shaft. The first sealing surface and the second sealing surface also has a second position wherein the first sealing surface and the second sealing surface permit the flow of liquid between the piston and the shaft.

22 Claims, 8 Drawing Sheets

U.S. PATENT DOCUMENTS

| | | |
|---|---|---|
| 4,231,493 | 11/1980 | Kutik et al. . |
| 4,235,353 | 11/1980 | Capra et al. . |
| 4,260,082 | 4/1981 | Rooney et al. . |
| 4,265,375 | 5/1981 | Flider ................................. 222/385 X |
| 4,271,990 | 6/1981 | Kutik et al. . |
| 4,325,499 | 4/1982 | Shay . |
| 4,325,500 | 4/1982 | Shay . |
| 4,325,501 | 4/1982 | Shay . |
| 4,392,594 | 7/1983 | Swett et al. . |
| 4,524,888 | 6/1985 | Tada . |
| 4,809,878 | 3/1989 | Rainey . |
| 4,872,595 | 10/1989 | Hammett et al. . |
| 4,899,913 | 2/1990 | Ruscitti et al. . |
| 4,901,878 | 2/1990 | Humphries . |
| 5,183,189 | 2/1993 | Baudin . |
| 5,381,932 | 1/1995 | Humphrey . |
| 5,395,032 | 3/1995 | Fuchs . |
| 5,419,463 | 5/1995 | Mizushima et al. . |
| 5,429,275 | 7/1995 | Katz . |
| 5,469,993 | 11/1995 | Hauf et al. . |
| 5,497,944 | 3/1996 | Weston et al. . |

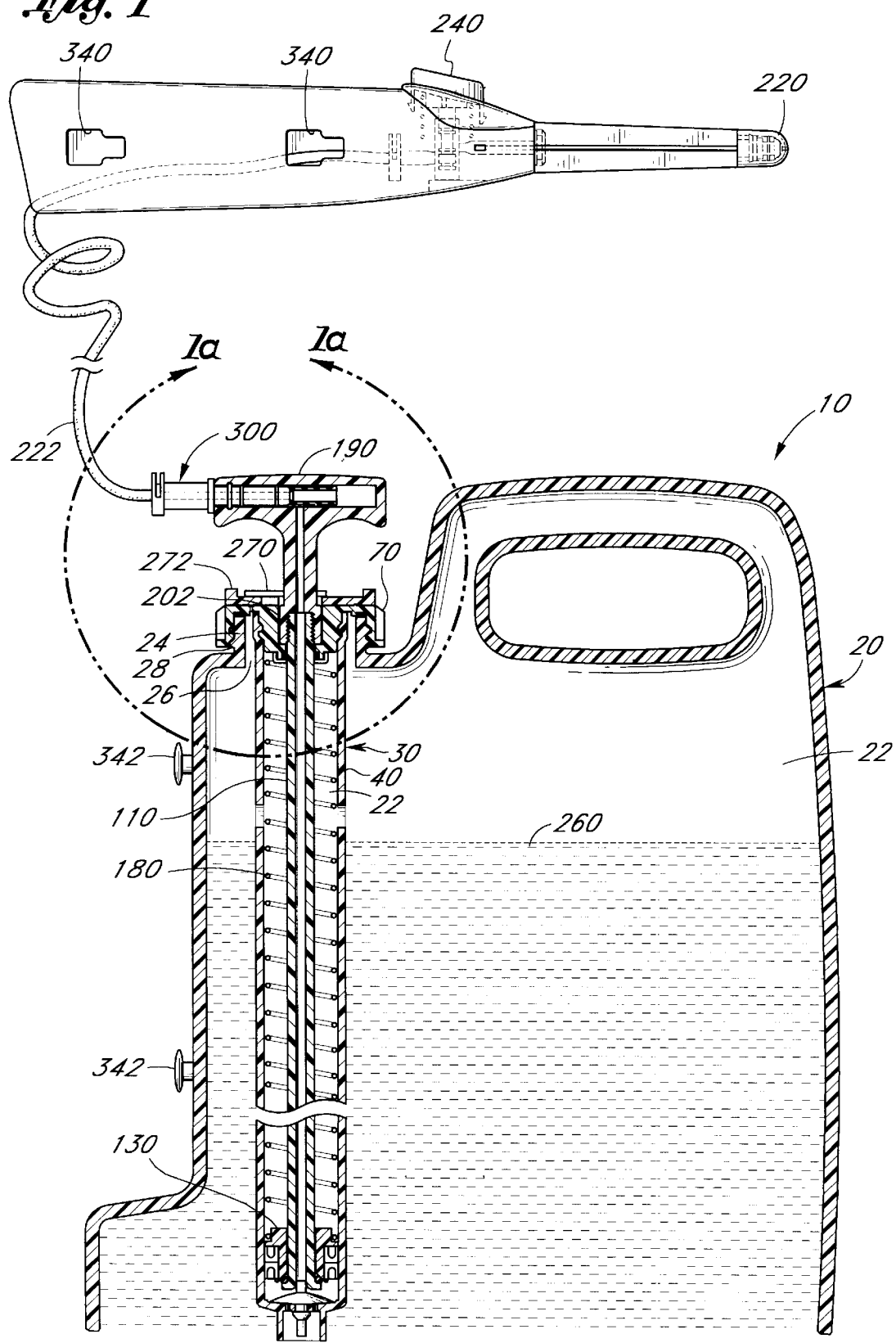

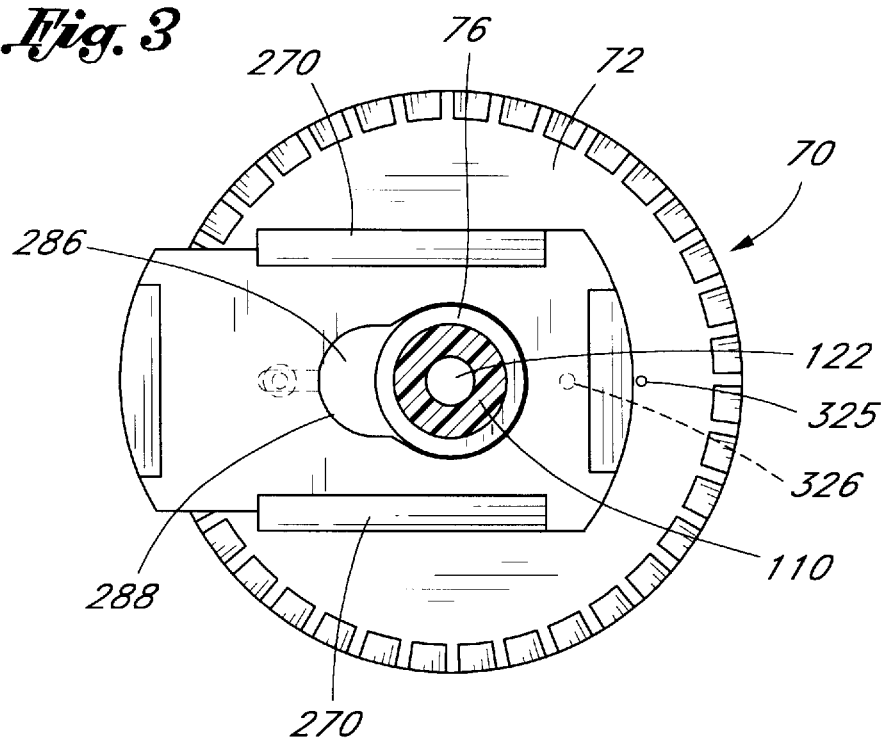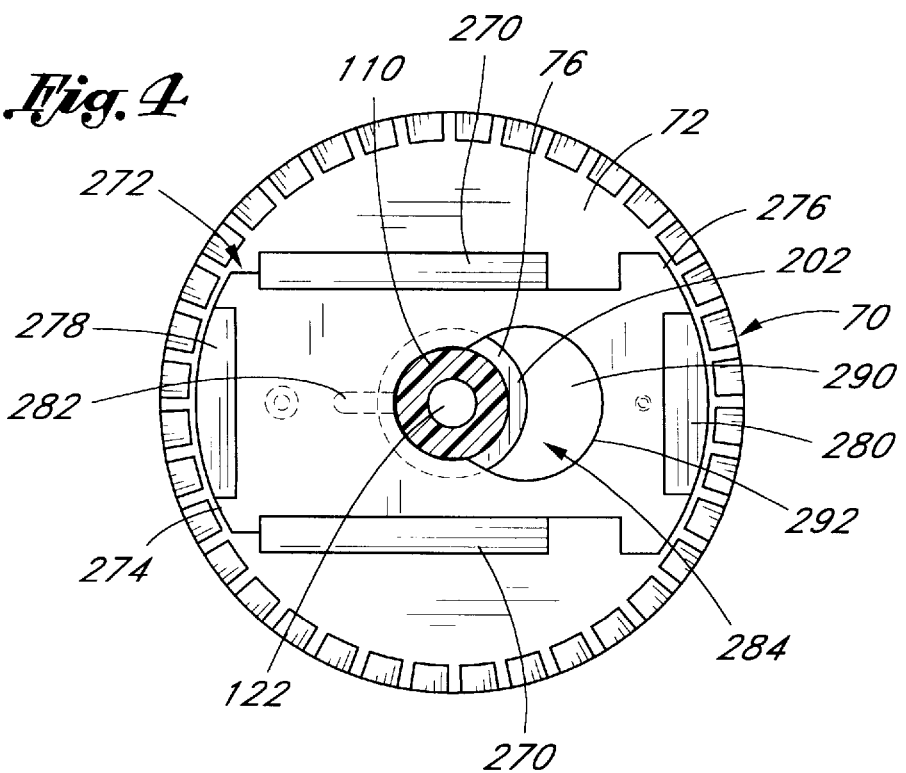

NON-AEROSOL PUMP SPRAY APPARATUS

FIELD OF THE INVENTION

This invention relates to pumps and, in particular, to nonaerosol pump sprayers.

BACKGROUND AND SUMMARY OF THE INVENTION

Noncontainer pressurizing pump sprayers commonly utilize an integral cylinder and plunger arrangement to generate pressure to expel liquid, such as insecticide and fertilizer from a container. Noncontainer pressurizing pump sprayers are desirable in that they do not utilize pressurized containers which must be handled carefully and at controller temperatures to avoid the risk of explosion. Noncontainer pressurizing pump sprayers have a number of other advantages, including not using propellants which destroy the ozone and being relatively inexpensive.

There are two common varieties of noncontainer pressurizing pump sprayers: pump sprayers that are pressurized on the upstroke and pump sprayers that are pressurized on the downstroke. Pump sprayers that are pressurized on the downstroke typically utilize a return spring which biases the plunger upward after the pressurization stroke. These sprayers suffer from the drawback that it is often undesirable to store or ship the pump sprayer with the plunger in the up position. Accordingly, the pump sprayer is generally shipped and stored with the return spring in a compressed position, causing the spring to fatigue and begin to wear out prematurely. Likewise, in the event of the inadvertent release of the return spring, the plunger cannot be depressed without pressurizing the fluid in the container. In the case of insecticide or other toxic chemicals, this is often undesirable.

While pump sprayers that are pressurized by pulling the plunger upward have the advantage of not having the plunger being forced outward inadvertently, they too, suffer from a number of drawbacks. For example, once the plunger is drawn upward, it is generally not possible to lower the plunger without discharging fluid. As drawing the plunger upward creates a relatively large volume of pressurized liquid, this either requires that a relatively large amount of fluid be wasted or the device be stored with the plunger extending outward.

U.S. Pat. No. 4,174,055, to Capra, et al., discloses an alternative dispenser. The disclosed dispenser incorporates a plunger which pressurizes the fluid on the upstroke, but also is provided with a separate return spring and collar for purposes of lowering the plunger handle independently of the main plunger piston. While this arrangement has advantages, it is more complicated and expensive than other pump sprayer arrangements. Further, while the system provides for slow bleeding off of pressure, the sprayer remains in a pressurized state for some time. Significantly, this substantially increases the risk of inadvertent discharge of chemicals by adults or children who may come into contact with the device.

The present invention includes an apparatus and pump attachment particularly adapted to form a noncontainer pressurizing pump sprayer which overcomes the drawbacks of the prior art. The apparatus desirably includes an attachment having a pump sprayer which is pressurized on the upstroke, enabling the sprayer to be shipped and stored in a relaxed position. Importantly, however, the plunger is adapted to permit the plunger to be quickly and easily lowered and the apparatus depressurized without discharging fluid. Significantly, these advantages are provided in a apparatus which is particularly adapted to be inexpensively manufactured and includes few moving parts, to enhance reliability.

One aspect of the invention is a pump attachment for a container defining a neck including a body, a coupling, a shaft, a piston, an inlet valve and a biasing member. The body defines an elongate chamber having a first end, a second end, and an interior wall extending between the first end and the second end. The coupler is sized and shaped to secure the body to the neck of a container. The shaft extends through the opening in the first end of the chamber and defines an internal flow channel. The piston is reciprocally mounted within the chamber and defines an inner annual surface surrounding the shaft and an outer annular surface sized and shaped to form a sealing engagement with the interior wall of the body. The piston separates the chamber into an upper portion above the piston and lower portion below the piston. The inlet valve is at the second end of the body and is configured to permit the flow of fluid into the chamber and restrict the flow of fluid out of the chamber. The biasing member is positioned between the piston and the first end of the chamber.

The attachment defines a first sealing surface substantially fixed with respect to the piston and a second sealing surface substantially fixed with respect to the shaft. The first sealing surface and the second sealing surface have a first position wherein the first sealing surface and the second sealing surface cooperate to prevent the flow of liquid between the piston and the shaft. The first sealing surface and the second sealing surface have a second position wherein the first sealing surface and the second sealing surface permit the flow of liquid between the piston and the shaft.

Advantageously, the shaft includes an outwardly extending surface which prevents the piston from sliding beyond the one end of the shaft. Likewise, the attachment desirably includes a first O-ring mounted on the shaft which defines the second sealing surface and an inwardly tapered seat which defines the first sealing surface.

The attachment may also include a spray nozzle communicating with the internal flow channel and an actuator for selectively preventing the flow of a fluid through the spray nozzle.

The attachment desirably includes a handle secured to the shaft and a latch movable between a first location wherein the latch generally prevents the shaft from being drawn through the first end of the body and the second location wherein the latch generally permits the shaft to be drawn through the first end of the body.

Another aspect of the invention is an apparatus including a container defining a neck and an attachment. The attachment includes a body, a coupler, a shaft, a piston, an inlet valve, and a biasing member. The body defines an elongate chamber having a first end, a second end and an interior wall extending between the first end and the second end. The coupler is sized and shaped to secure the body to the neck of the container. The shaft extends through an opening in the first end of the chamber and defines an internal flow channel. The piston is reciprocally mounted within the chamber and defines an inner annular surface surrounding the shaft and an outer annular surface sized and shaped to form a sealing engagement with the interior wall of the body. The piston separates the chamber into an upper portion above the piston and a lower portion below the piston. The inlet valve at the second end of the body is configured to permit the flow of fluid into the chamber and restrict the flow of fluid out of the chamber. The biasing member is positioned between the piston and the first end of the chamber.

The attachment includes a first sealing surface substantially fixed with respect to the piston and a second sealing surface substantially fixed with respect to the shaft. The first sealing surface and the second sealing surface have a first position wherein the first sealing surface and the second sealing surface cooperate to prevent the flow of liquid between the piston and the shaft. The first sealing surface and the second sealing surface have a second position wherein the first sealing surface and the second sealing surface permit the flow of liquid between the piston and the shaft.

Yet another aspect of the invention is a method of arming and disarming a spray apparatus, including a container containing fluid and an attachment mounted thereto having a body defining an elongate chamber, a shaft extending through an opening in the chamber, the shaft defining an internal flow channel, a piston reciprocating mounted in the chamber, a check valve and a biasing member, including (1) moving the shaft in a first direction relative to the body, thereby moving the piston in the direction and drawing fluid from the container into the chamber through the check valve and compressing the biasing member; (2) permitting the biasing member to force the piston against the fluid in the chamber in a second direction pressurizing the fluid; (3) releasing liquid from the chamber through the internal flow channel in the shaft; and (4) moving the shaft in a second direction relative to the body and the piston to release a seal between the piston and the shaft, thereby permitting the flow of fluid between the piston and the shaft depressurizing the fluid.

BRIEF DESCRIPTION OF THE DRAWINGS

These and other aspects of the invention will now be discussed in connection with the accompanying drawings, which form a part hereof.

FIG. 1 is a vertical sectional view of an apparatus including a pump attachment, in accordance with a preferred embodiment of the invention, showing the parts in their normal at-rest position.

FIG. 3 is a sectional view taken along 3—3 of FIG. 2, illustrating the latch in an unlocked position.

FIG. 4 is a sectional view similar to FIG. 3, but illustrating the latch in a locked position.

DETAILED DESCRIPTION OF THE PREFERRED EMBODIMENT

Figure 1A:
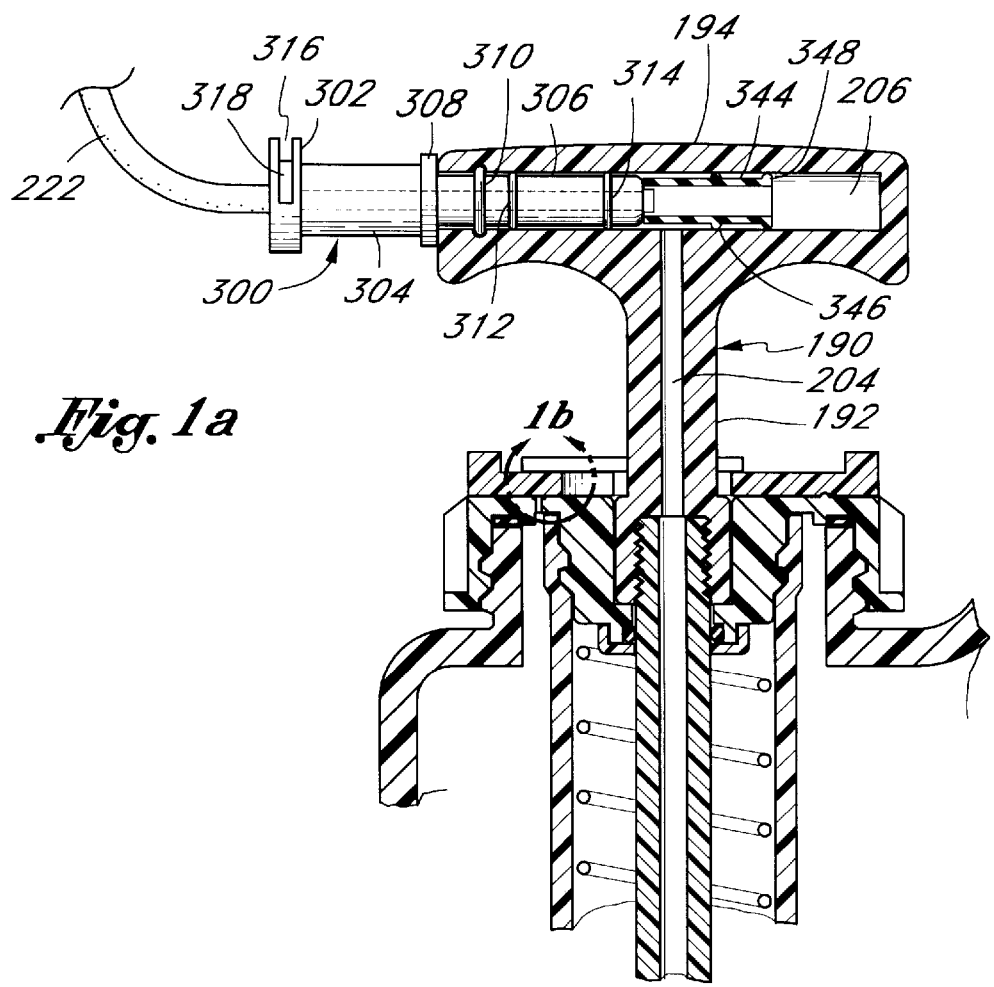
FIG. 1a is an enlarged sectional view of the area with the circle 1a—1a of FIG. 1.
Figure 1B:
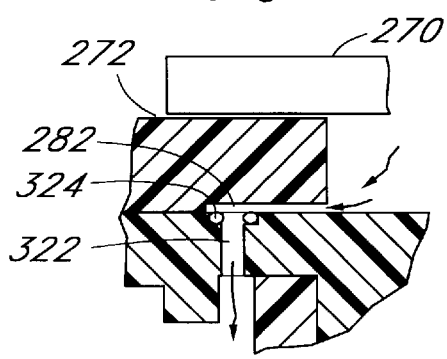
FIG. 1b is an enlarged sectional view of the area within the circle 1b—1b of FIG. 1a, illustrating an open vent passage.

Referring now to FIG. 1, a preferred assembly 10 will now be described. The assembly 10 includes a container 20 and pump attachment 30. The container 20 is illustrated partially filled with fluid 260. The container 20 defines an internal space or reservoir 22 and a neck 24 which defines an opening or port 26. The neck 24 desirably defines a series of external threads 28.

The attachment 30 includes a body 40, which is secured on the container 20 by means of a coupler 70. The attachment further includes a shaft 110 which is connected to a piston 130. A handle 190 is mounted on the shaft 110. A wand or spray nozzle 220 is connected to the handle 190 by tubing 222. Advantageously, the nozzle 220 includes a release valve, which controls the flow of fluid through the spray nozzle 220 and an actuator 240 for controlling the release valve.

Figure 5:
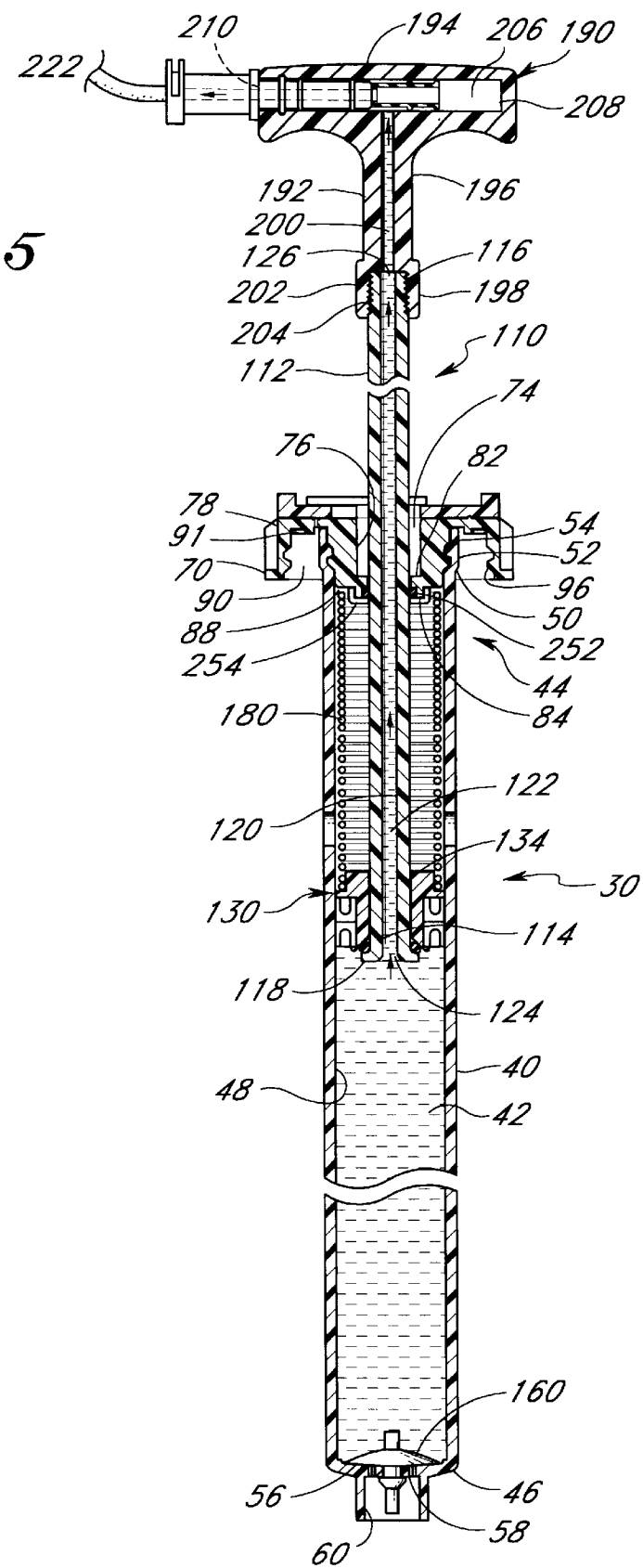
FIG. 5 is a partial sectional view illustrating the pump attachment in a fully pressurized position.

Referring to FIG. 5, the body 40 of the attachment 30 will now be described in detail. The body 40 defines an internal chamber 42. The body 40 includes first or upper end 44, a second or lower end 46 and a cylindrical internal wall 48. The upper end 44 of the body 40 includes an outwardly tapering portion 50 and an upper cylindrical flange 52, provided with internal threads 54. The lower end 46 of the body 40 is provided with an annular overhanging lip 56 defining a series of openings 58 and a depending flange 60 extending downward from the annular lip 56 surrounding the opening 58.

Referring to FIGS. 3–4 and 5, the coupler 70 includes a disk-shaped base 72 which partially defines a central aperture 74. A coupler 70 includes a pair of depending and concentric annular lips. The first or inner annular lip 76 likewise partially defines the aperture 74. The second or outer annular lip 78 is spaced from and surrounds the inner annular lip 76.

The inner annular lip 76 defines an overhanging flange 82 and a depending ridge 84. The inner lip 76 and the overhanging flange 82 cooperate to define a handle seat. The overhanging flange 82 and depending ridge 84 cooperate to define an inner O-ring seat. The first annular lip 76 and the depending ridge 84 likewise form an outer annular spring groove 88. The inner annular lip 76, the base 72 and outer annular lip 78 cooperate to define a first annular channel 90. Which defines a seat which receives an O-ring 91. The outer annular lip 78 is provided with internal threads 96.

The shaft 110 has a first or upper end 112 and a second or lower end 114. The upper end is provided with external threads 116. The lower end 114 of the shaft 110 advantageously includes a radially outward extending portion 118. The shaft includes an internal wall 120 which defines an internal flow channel 122 having a lower inlet end 124 and an upper outlet end 126.

Figure 6:
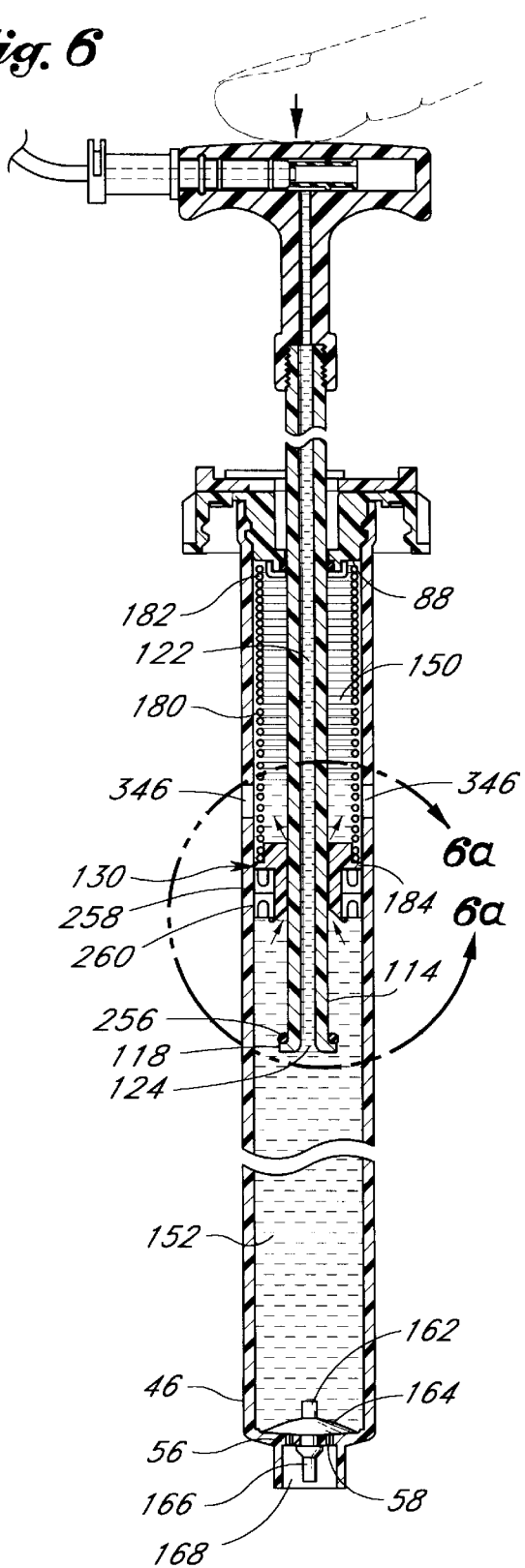
FIG. 6 is a partial sectional view illustrating the release of pressure in the chamber by means of an external downward force on the handle.
Figure 6A:
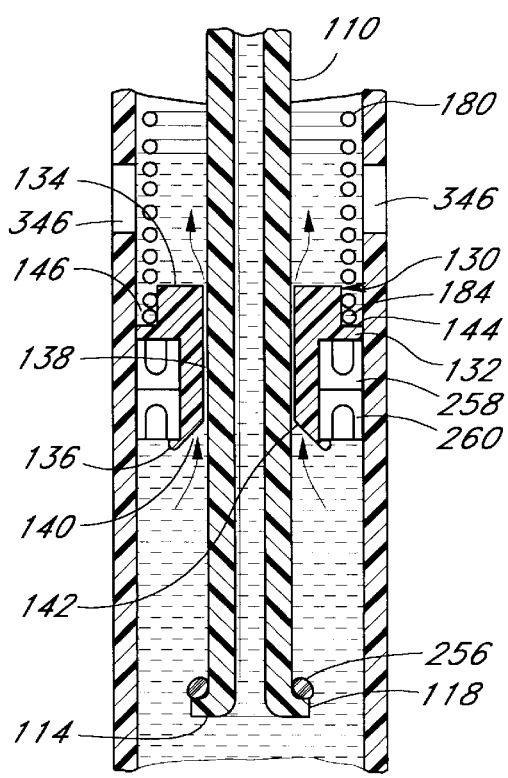
FIG. 6a is an enlarged sectional view of the area 6a—6a of FIG. 6 illustrating the flow of fluid between the outer surface of the shaft and the inner annular surface of the piston.

Referring to FIGS. 6 and 6a, the piston 130 is mounted around the shaft 110. The piston includes a body 132 having a top 134 and bottom 136. The piston defines an inner annular surface 138, which defines an internal channel 140. The inner annular surface 138 desirably defines a tapering portion 142. The piston 130 desirably additionally includes a series of radially extending locating ribs which define a series of upper surfaces 144. These surfaces 144 cooperate to define an outer annular groove 146 for receiving the biasing member 180.

The piston 130 divides the internal chamber 42 of the body 40 of the attachment into a first or upper portion 150 and a second or lower portion 152. Mounted within the opening 58 defined by the overhanging lip 56 of the lower end 46 of the body 40 is the inlet or check valve 160. The check valve 160 permits the flow of fluid into the internal chamber 42 of the body 40 of the attachment, while preventing the flow of fluid out of the internal chamber 42. Advantageously, the check valve 160 is provided with an upper nipple 162 which mates with the inlet 124 of the shaft. The lower nipple 166 secures the check valve 160 in place. Likewise, the check valve is provided with a lower nipple 166 depending from the overhanging lip 56 of the lower end 46 of the body 40. The check valve defines a central flow channel 168.

The biasing member 180 has a first or upper end 182 which is seated in the outer annular spring groove 88 of the coupler and a second end 184 which is seated in the annular groove 146 in the top of 134 of the piston 130.

Referring to FIG. 5, the handle 190 is mounted on the upper end 112 of the shaft 110. The handle includes a vertical stem 192 and a grip or horizontal portion 194. The horizontal portion is desirably integrally formed with an upper end 196 of the stem 192 and the lower end 198 of the stem 192 is desirably secured to the upper end 112 of the shaft 110. The stem desirably defines an internal flow channel 200. The lower end 198 of the stem 192 desirably defines a larger mouth portion 202 which defines internal threads 204 with the external threads of 116 on the upper end 112 of the shaft 110. The horizontal portion 194 desirably likewise defines an internal flow channel 206 which communicates with the internal flow channel 200 of the stem 192, and includes a closed end 208 and an open end 210.

Referring to FIGS. 1 and 1a–1d, the attachment of the tubing 222 to the horizontal portion 194 of the handle 190 will now be described. To ensure a fluid-tight seal, the tubing 222 is locked to an adaptor 300 and the adaptor 300 is locked to the horizontal portion 194 of the handle 190. As seen in FIG. 1a, the adaptor 300 has a disc-shaped outer section 302, a cylindrical intermediate section 304 and a smaller diameter cylindrical inner section 306. The intermediate section 304 includes an enlarged annular stop 308 proximate to the inner section 306. The inner section 306 includes an annular locking flange 310 which mates with a corresponding annular detent in the horizontal portion 194 of the handle 190. The inner section 306 further comprises a first sealing ring 312 and a second sealing ring 314 spaced inward from the locking flange and sized to form a fluid-tight seal with the wall defining the internal flow channel 206 of the horizontal portion 194 of the handle 190. The outer section 302 defines a pocket 316 for receiving a locking ring 318. As best seen in FIG. 1e, the locking ring 318 defines a plurality of gripping edges or corners 320, which are adapted to apply pressure against the outer surface of the tubing 222 and prevent it from being inadvertently pulled from the adaptor 300.

To ensure proper operation of the assembly 10, the assembly includes a number of additional sealing members, which will now be described. A first seal or O-ring 252 is mounted at the upper end 44 of the attachment 30 within the inner O-ring seat defined by the first annular lip 76 and overhanging flange 82 out of the coupler 70. The first O-ring 252 is secured within the seat by means of an annular retaining clip 254 which desirably surrounds the depending ridge 84. Referring to FIGS. 6 and 6a, a second seal or O-ring 256 surrounds the second end 114 of the shaft 110 and desirably abuts against the radially outward extending portion 118 of the shaft 110. To ensure that the piston 130 forms a sealing engagement with the internal wall 48 of the body 40 of the attachment 30, the piston 130 is desirably provided with a first and a second sealing gasket or cup seals, 258 and 260, respectively. Specifically, the body 132 of the piston 130 desirably defines an annular space between the bottom 136 of the piston and the portion of the body 132 which defines the outer annular surface 144 and the gaskets 258 and 260 are resiliently secured to the body 132 filling the space. The gaskets 258 and 260 ensure that the piston 130 forms a fluid-tight seal with the internal wall 48 of the body 40 and prevent flow between the gaskets 258 and the external wall of the piston body.

Figure 8:
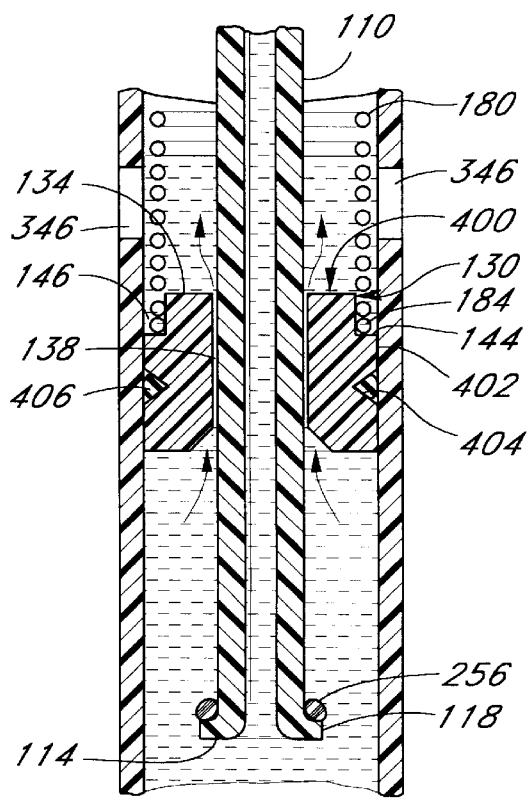
FIG. 8 is a view similar to FIG. 6a illustrating an alternative piston design.

FIG. 8 shows an alternative piston design which may be desirable to avoid the need for relatively expensive cup seals. Specifically, the piston 400 defines an outer generally cylindrical surface 402 which is bisected by an annular triangular detent 404 which receives a sealing member or O-ring 406. The O-ring 406 ensures a fluid-tight seal between the piston 400 and the internal wall of the body of the attachment.

Figure 1C:
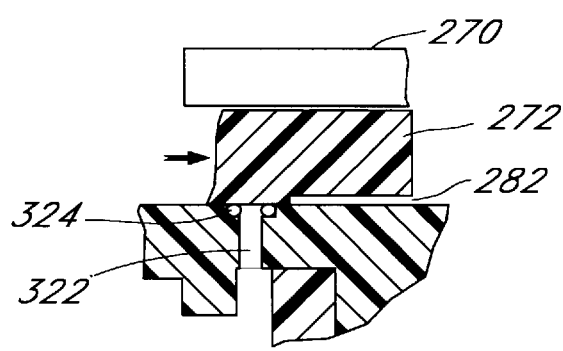
FIG. 1c is an enlarged sectional view similar to FIG. 1b, but illustrating a closed passage.

The assembly 10 is desirably provided with a mechanism for locking the handle in a fully retracted position. Referring to FIGS. 1, 3 and 4, the coupler 70 desirably defines a pair of parallel L-shaped overhanging flanges 270. The flanges 270 are sized and shaped to permit a locking plate 272 to slide snugly between the flanges 270. The locking plate includes a first end 274 and a second end 276. The first end 274 defines a first grip portion 278 and the second end 276 defines a second grip portion 280. Desirably, the locking plate defines a vent passage 282 which cooperates with a corresponding vent opening 322 in the base 72 of the coupler 70, when the locking plate is in its unlocked position. Surrounding the top of the vent opening 322 is a sealing member 324, such as an O-ring to prevent leakage of fluid when the locking plate 272 is in its locked position, as shown in FIG. 1c.

The locking plate 272 defines an aperture 284 including a first smaller portion 286 defined by first edge 288 sized and shaped to snugly receive the portion of the stem 192 of the handle 190 above the larger mouth portion 202. The aperture 284 further includes a larger second portion 290 defined by a second edge 292 which is sized and shaped to permit the free movement of the larger mouth portion 202 of the stem 192 of the handle 190 therethrough.

Referring to FIG. 3, the base 72 of the coupler 70 desirably defines a raised dimple 325 positioned to abut the outer edge of the locking plate 272 to keep the locking plate from sliding when the locking plate 272 is in the open position. Advantageously, the locking plate 272 is provided with a mating detent 326 to receive and retain the dimple 325 when the locking plate is in the closed position shown in FIG. 4.

The operation of the apparatus will now be described.

Figure 1D:
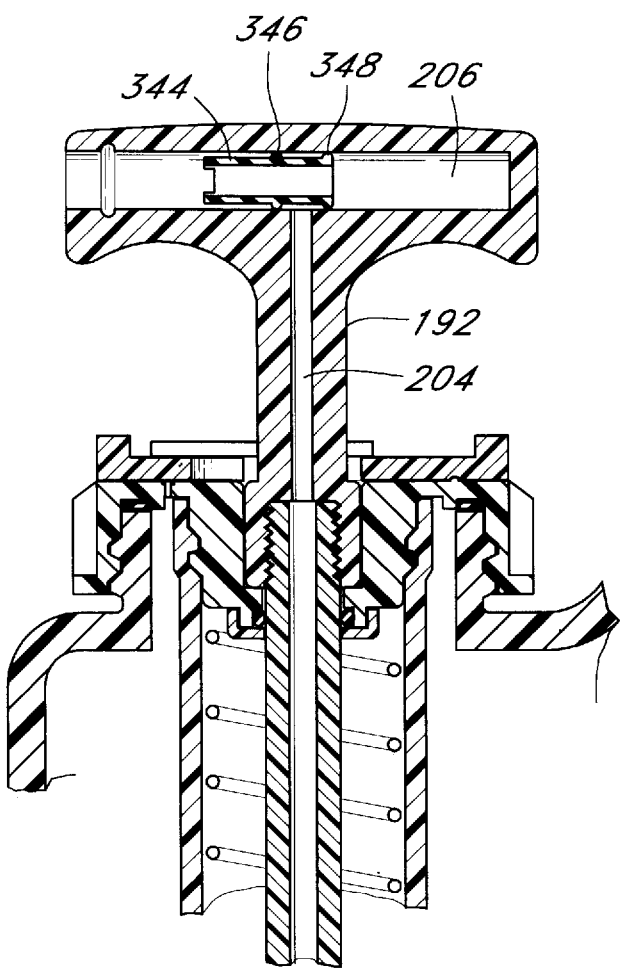
FIG. 1d is an enlarged sectional view similar to FIG. 1a, but showing the handle plug used during shipping.
Figure 1E:
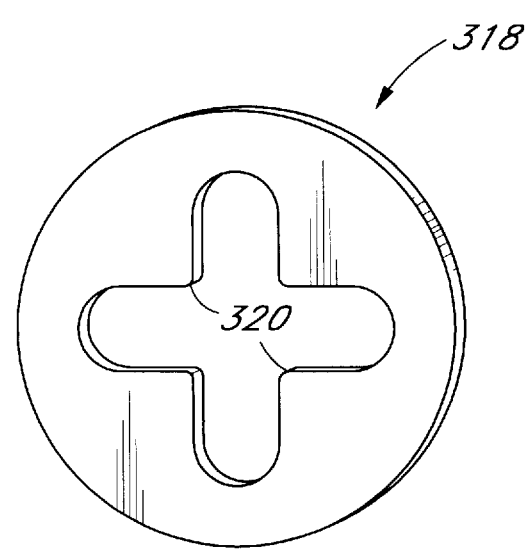
FIG. 1e is an enlarged view of a locking ring used by the adaptor.

Referring to FIGS. 1 and 1d, during storage or shipment, the shaft 110 is secured in its fully retracted position, with the mouth portion 202 of the handle 190 being retained in position by the locking plate 272. During shipment, the tubing 222 connecting the spray nozzle 222 to the handle 190 may be secured in a hollow portion of the spray nozzle 220. The nozzle 220 is desirably provided with a pair of openings 340 for receiving and retaining a pair of mating studs 342 projecting from the side of the container 20. As shown in FIG. 1d, during shipment the inlet to the internal flow channel 204 of the stem 192 of the handle is blocked by a plug 344 mounted within the internal flow channel 206 of the horizontal portion 194 of the handle. The plug 344 includes first and second sealing flanges 346 and 348 which prevent the flow of fluid between them and the wall forming the internal flow channel 206.

Importantly, the mating of the upper nipple 162 of the check valve 160 with the inlet 124 of the shaft prevents fluid from leaking out the handle during shipment and storage of the assembly 10, prior to use. On the other hand, the plug 344 provides a failsafe backup in the event the locking plate 272 is moved to the open position and the handle is raised.

Figure 2:
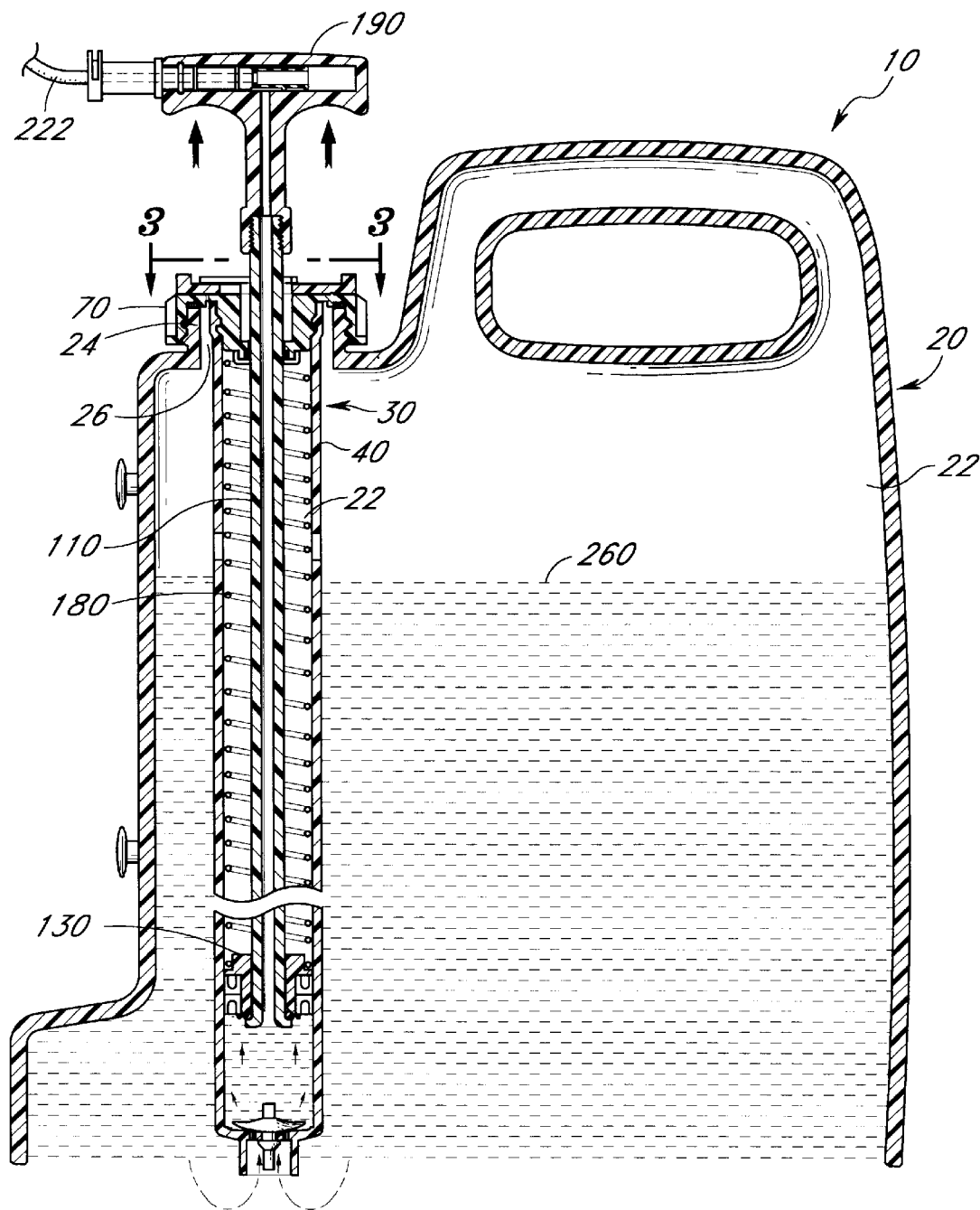
FIG. 2 is a vertical sectional view of the device of FIG. 1, showing the actuator moved to an upwardly or outwardly telescoped position relative the container in order to move the piston in the accumulating chamber or reservoir to compress the biasing member and pressurize fluid within the chamber.

When it is desired to use the assembly 10 to dispense fluid 260 from the container 20, the adaptor 300 on the end of the tubing 222 is inserted into the internal flow channel 206 of the horizontal 194 portion of the handle. This causes the inner section 306 of the adaptor 300 to push the plug away from the outlet of the internal flow channel 206 of the horizontal portion of the handle so that the sealing flanges 346 and 348 are pushed beyond the outlet of the internal flow channel 204 of the stem 204, as shown in FIG. 1a. The locking plate 272 is then moved from the locked position shown in FIG. 4 to the unlocked position shown in FIG. 3. The grip portion 194 of the handle can then be lifted upward as illustrated in FIG. 2. This causes the second O-ring 256 to press against the tapering portion 142 of the body 132 of the piston 130 creating a fluid-tight seal. This also causes the fluid 260 to be drawn through the check valve 160 into the lower portion 152 of the chamber 42. It is not necessary to draw the handle completely upward. On the other hand, to maximize the amount of fluid that may be dispensed without repressurizing the container, the handle may be drawn to its fully pressurized position as illustrated in FIG. 5. In this position, the spring 180 is fully compressed between the coupler 70 and the piston 130. The handle 190 is then released, allowing the spring 180 to force the piston 130 downward against the fluid 260 in the lower portion 152 of the chamber 42. As the check valve 160 prevents fluid from flowing out of the chamber 42 fluid is forced upward through the inlet end 124 of the internal flow channel 122 defined by the shaft 110. This fluid flows through the internal flow channel 200 of the stem 192 and the internal flow channel 206 of the grip portion 194 of the handle 190. The fluid is likewise forced through the tubing 222 to the spray nozzle 220. Fluid is dispensed from the spray nozzle 220 by depressing the actuator 240 operating the release valve (not shown) for the nozzle 220.

Significantly, the assembly 10 of the present invention permits the quick and easy release of pressure within the pump attachment 30. Specifically, as shown in FIGS. 6 and 6a, the handle 190 can be forced rapidly downward so as to move the second end 114 of the shaft 110 downward relative the piston 130. This causes the second O-ring mounted on the radially outward extending portion 118 of the lower end 114 of the shaft 110 to move downward away from the tapering portion 142 of the inner annular surface 138. This releases a seal between the shaft 110 and the piston 130 and permits fluid 260 to flow through the channel 140 between the inner annular surface 138 of the piston 130 and the outer surface of the shaft 110. This fluid 260 is eventually drained from the upper portion 150 of the body 40 of the attachment through a pair of outlet openings 346.

Figure 7:
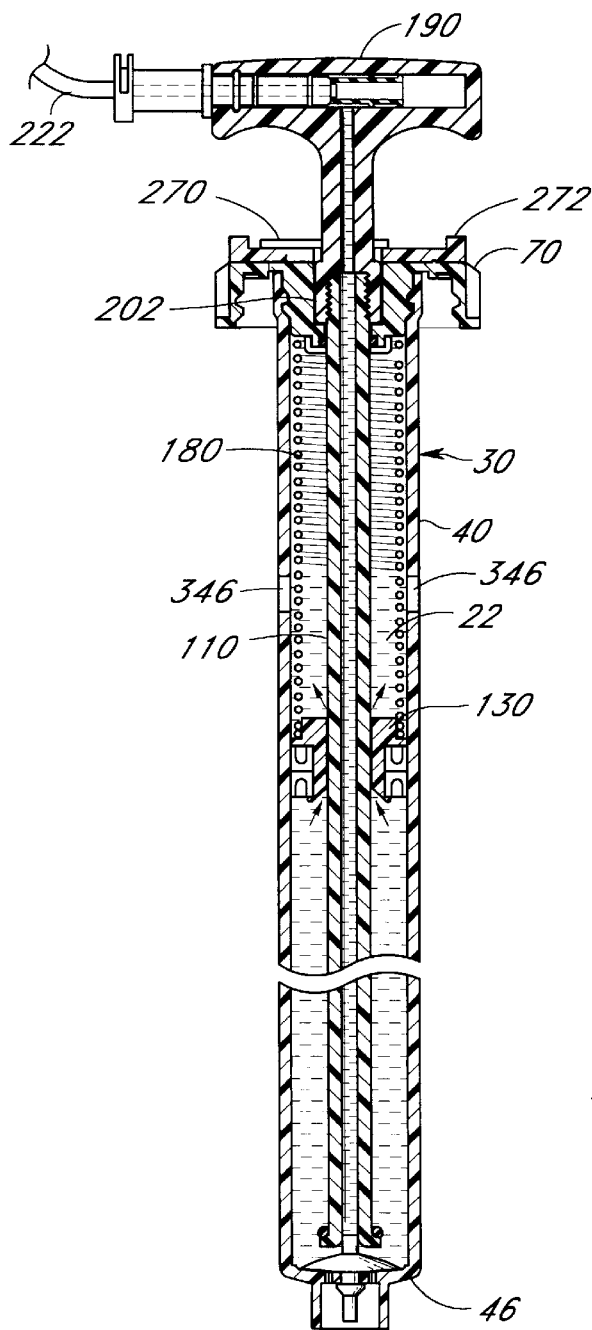
FIG. 7 illustrates the pump attachment in its fully locked and retracted position quickly depressurizing through the flow of fluid between the shaft and the piston.

Importantly, the release of pressure from the body 40 of the attachment 30 prevents fluid from inadvertently being released from the assembly 10 during operation, transport and storage of the apparatus. Further, as illustrated in FIG. 7, this release of pressure permits the shaft 110 to return to its fully retracted position so that the mouth portion 202 of the handle can be received within the aperture 74 in the coupler 70 against the coupler 70 and locked in place against the handle seat by the locking plate of the coupler.

Those of skill in the art will recognize that this invention may be embodied in several forms, without departing from the spirit of the invention, and the foregoing description is therefore intended to be illustrative and not restrictive.

I claim:

1. A pump attachment for a container defining a neck, comprising:

a body defining an elongate chamber having a first end, a second end and an interior wall extending between said first end and said second end;

a coupler sized and shaped to secure said body to a neck of a container;

a shaft extending through an opening in said first end of said chamber, said shaft defining an internal flow channel;

a piston reciprocally mounted within said chamber, said piston defining an inner annular surface surrounding said shaft and an outer annular surface sized and shaped to form a sealing engagement with said interior wall of said body, said piston separating said chamber into an upper portion above said piston and a lower portion below said piston;

an inlet valve at said second end of said body, configured to permit the flow of fluid into said chamber and restrict the flow of fluid out of said chamber; and a biasing member between said piston and said first end of said chamber, wherein said attachment further defines a first sealing surface substantially fixed with respect to said piston and a second sealing surface substantially fixed with respect to said shaft, said first sealing surface and said second sealing surface having a first position wherein said first sealing surface and said second sealing surface cooperate to prevent the flow of liquid between said piston and said shaft and a second position wherein said first sealing surface and said second sealing surface permit the flow of liquid between said piston and said shaft.

2. The attachment of claim 1, wherein one end of said shaft includes an outwardly extending surface which prevents said piston from sliding beyond said one end of said shaft.

3. The attachment of claim 2, wherein said attachment further comprises an O-ring mounted on said shaft, which defines said second sealing surface.

4. The attachment of claim 3, wherein said attachment further comprises an inwardly tapered seat, which defines said first sealing surface.

5. The attachment of claim 1, wherein said attachment further comprises an O-ring mounted on said shaft, which defines said second sealing surface.

6. The attachment of claim 1, wherein said attachment further comprises a spray nozzle communicating with said internal flow channel.

7. The attachment of claim 6, wherein said attachment further comprises an actuator for selectively preventing the flow of fluid through said spray nozzle.

8. The attachment of claim 1, wherein said attachment further comprises a handle secured to said shaft.

9. The attachment of claim 8, wherein said attachment further comprises a latch movable between a first location wherein said latch generally prevents said shaft from being drawn through said first end of said body and a second location wherein said latch generally permits said shaft from being drawn through said first end of said body.

10. The attachment of claim 9, wherein said attachment further comprises a spray nozzle communicating with said internal flow channel.

11. An apparatus, comprising:
a container defining a neck;
an attachment, comprising:
a body defining an elongate chamber having a first end, a second end and an interior wall extending between said first end and said second end;
a coupler sized and shaped to secure said body to said neck of a container;
a shaft extending through an opening in said first end of said chamber, said shaft defining an internal flow channel;
a piston reciprocally mounted within said chamber, said piston defining an inner annular surface surrounding said shaft and an outer annular surface sized and shaped to form a sealing engagement with said interior wall of said body, said piston separating said chamber into an upper portion above said piston and a lower portion below said piston;
an inlet valve at said second end of said body, configured to permit the flow of fluid into said chamber and restrict the flow of fluid out of said chamber;
a biasing member between said piston and said first end of said chamber, wherein said attachment further defines a first sealing surface substantially fixed with respect to said piston and a second sealing surface substantially fixed with respect to said shaft, said first sealing surface and said second sealing surface having a first position wherein said first sealing surface and said second sealing surface cooperate to prevent the flow of liquid between said piston and said shaft and a second position wherein said first sealing surface and said second sealing surface permit the flow of liquid between said piston and said shaft.

12. The apparatus of claim 11, wherein said attachment further comprises an O-ring mounted on said shaft, which defines said second sealing surface.

13. The apparatus of claim 12, wherein said attachment further comprises an inwardly tapered seat which defines said first sealing surface.

14. The apparatus of claim 13, wherein said attachment further comprises a handle secured to said shaft.

15. The apparatus of claim 14, wherein said attachment further comprises a latch movable between a first location wherein said latch generally prevents said shaft from being drawn through said first end of said body and a second location wherein said latch generally permits said shaft from being drawn through said first end of said body.

16. The apparatus of claim 15, wherein said apparatus further comprises a spray nozzle communicating with said internal flow channel.

17. The apparatus of claim 16, wherein one end of said shaft includes an outwardly extending surface which prevents said piston from sliding beyond said one end of said shaft.

18. The attachment of claim 11, wherein said attachment further comprises a handle secured to said shaft.

19. The attachment of claim 18, wherein said attachment further comprises a latch movable between a first location wherein said latch generally prevents said shaft from being drawn through said first end of said body and a second location wherein said latch generally permits said shaft from being drawn through said first end of said body.

20. The apparatus of claim 19, wherein said attachment further comprises an O-ring mounted on said shaft, which defines said second sealing surface.

21. A method of arming and disarming a spray apparatus including a container containing fluid and an attachment mounted thereto having a body defining an elongate chamber, a shaft extending through an opening in said chamber, said shaft defining an internal flow channel, a piston reciprocally mounted within said chamber, a check valve and a biasing member, comprising:
moving said shaft in a first direction relative said body, thereby moving said piston in said first direction and drawing fluid from said container into said chamber through said check valve and compressing said biasing member;
permitting said biasing member to force said piston against said fluid in said chamber in a second direction pressurizing said fluid;
releasing liquid from said chamber through said internal flow channel in said shaft; and
moving said shaft in a second direction relative said body and said piston to release a seal between said piston and said shaft, thereby permitting the flow of fluid between said piston and said shaft depressurizing said fluid.

22. The apparatus of claim 21, wherein said attachment further comprises a spray nozzle, further comprising spraying said released liquid through said spray nozzle.

\* \* \* \* \*